US011126701B2

(12) United States Patent
Kikuchi (10) Patent No.: US 11,126,701 B2
(45) Date of Patent: Sep. 21, 2021

(54) SURVEYING INSTRUMENT AND SURVEYING INSTRUMENT MANAGEMENT SYSTEM

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 233 days.

(21) Appl. No.: 16/558,494

(22) Filed: Sep. 3, 2019

(65) Prior Publication Data

US 2020/0104469 A1    Apr. 2, 2020

(30) Foreign Application Priority Data

Sep. 27, 2018 (JP) .............................. JP2018-181369

(51) Int. Cl.
| | |
|---|---|
| *G06F 21/31* | (2013.01) |
| *H04L 29/06* | (2006.01) |
| *H04L 29/08* | (2006.01) |
| *G06C 15/12* | (2006.01) |
| *G06C 15/00* | (2006.01) |
| *G01C 15/12* | (2006.01) |

(52) U.S. Cl.
CPC ............ *G06F 21/31* (2013.01); *G01C 15/12* (2013.01); *H04L 63/0838* (2013.01); *H04L 67/306* (2013.01)

(58) Field of Classification Search
CPC ... G06F 21/31; H04L 63/0838; H04L 67/306; H04L 67/025; H04L 63/083; H04L 63/0861; G01C 15/12; G01C 15/002
See application file for complete search history.

(56) References Cited

U.S. PATENT DOCUMENTS

| 7,523,069 B1 * | 4/2009 | Friedl ...................... G07C 9/37 |
| | | 705/50 |
| 9,330,513 B2 * | 5/2016 | Soni ........................ G06F 21/32 |

(Continued)

FOREIGN PATENT DOCUMENTS

| JP | 2005-351834 A | 12/2005 |
| JP | 2006-38581 A | 2/2006 |

*Primary Examiner* — Darren B Schwartz
(74) *Attorney, Agent, or Firm* — Roberts Calderon Safran & Cole P.C.

(57) ABSTRACT

An object is to provide a surveying instrument and system to manage instrument setting and usage data for each personal user. The surveying instrument includes a personal authentication sensor, a control unit, and a storage unit. A personal information registration unit of the control unit acquires personal authentication information from the sensor and stores the personal authentication information in a personal identification information database of the storage unit in association with user information. A personal authentication execution unit of the control unit identifies a user based on whether authentication data acquired by the sensor matches personal authentication information stored in the personal identification information database. A personal setting application unit of the control unit refers to a personal setting information database in the storage unit, and when finding instrument setting saved by the authenticated user, applies the instrument setting and starts the surveying instrument.

6 Claims, 7 Drawing Sheets

(56) References Cited

U.S. PATENT DOCUMENTS

| | | | | |
|---|---|---|---|---|
| 10,325,087 B1* | 6/2019 | Goodsitt | | G06F 21/42 |
| 10,733,275 B1* | 8/2020 | Knas | | G06F 21/32 |
| 10,956,544 B1* | 3/2021 | Knas | | G06K 9/00912 |
| 2004/0078605 A1* | 4/2004 | Gruber | | G06F 21/32 |
| | | | | 726/16 |
| 2005/0210271 A1* | 9/2005 | Chou | | G06F 21/32 |
| | | | | 713/186 |
| 2005/0274031 A1 | 12/2005 | Imamura et al. | | |
| 2006/0016085 A1* | 1/2006 | Imamura | | G01C 15/00 |
| | | | | 33/290 |
| 2006/0064741 A1* | 3/2006 | Terao | | H04L 63/083 |
| | | | | 726/4 |
| 2006/0082437 A1* | 4/2006 | Yuhara | | B60R 25/04 |
| | | | | 340/5.82 |
| 2007/0076238 A1* | 4/2007 | Odagiri | | G06K 15/00 |
| | | | | 358/1.14 |
| 2007/0245156 A1* | 10/2007 | Minamizawa | | G06F 21/32 |
| | | | | 713/186 |
| 2007/0287450 A1* | 12/2007 | Yang | | H04W 12/35 |
| | | | | 455/433 |
| 2008/0244712 A1* | 10/2008 | Kitada | | G06F 21/41 |
| | | | | 726/5 |
| 2008/0289032 A1* | 11/2008 | Aoki | | G06F 21/33 |
| | | | | 726/19 |
| 2009/0067685 A1* | 3/2009 | Boshra | | G06F 21/32 |
| | | | | 382/124 |
| 2009/0244277 A1* | 10/2009 | Nagashima | | G01C 15/002 |
| | | | | 348/135 |
| 2010/0191947 A1* | 7/2010 | Shin | | H04W 12/125 |
| | | | | 713/2 |
| 2012/0167188 A1* | 6/2012 | Poornachandran | | H04W 12/06 |
| | | | | 726/7 |
| 2012/0224164 A1* | 9/2012 | Hayashi | | G01C 3/08 |
| | | | | 356/3 |
| 2015/0180866 A1* | 6/2015 | Hama | | G06F 21/32 |
| | | | | 726/6 |
| 2015/0242840 A1* | 8/2015 | Kursun | | G06Q 20/4016 |
| | | | | 705/44 |
| 2017/0155800 A1* | 6/2017 | Nagasawa | | G06F 21/32 |
| 2017/0261978 A1* | 9/2017 | Gresch | | G06Q 30/0645 |
| 2017/0280003 A1* | 9/2017 | Haba | | H04L 63/0492 |
| 2018/0355638 A1* | 12/2018 | Harring | | A45C 11/00 |
| 2020/0331431 A1* | 10/2020 | Fushimi | | B60R 25/245 |

* cited by examiner

SURVEYING INSTRUMENT AND SURVEYING INSTRUMENT MANAGEMENT SYSTEM

TECHNICAL FIELD

The present invention relates to a surveying instrument and a surveying instrument management system to manage instrument setting and usage data for each personal user.

BACKGROUND ART

A surveying instrument (total station) is a device to measure a distance and an angle to a measurement point by irradiating distance-measuring light onto a target placed at the measurement point and receiving light reflected from the target. Surveying instruments in recent years have been further computerized, and have many functions such as radiation observation, coordinate observation, pairwise observation, staking measurement, opposite side measurement, multi-angle calculation, area calculation, and topographical survey, etc.

When a user is a large-scale company, the user possesses a plurality of surveying instruments, and performs identification and management to prevent a mix-up of the instruments. Or, when a user is a rental or lease agent, the user performs management to restrict functions according to contract details. There are available, for management to be performed by the former user, a technology to indicate a mark unique to a surveying instrument on a display screen of the surveying instrument to prevent the mix-up (Patent Literature 1), and for management to be performed by the latter user, a technology to prepare a storage medium for management, etc. (Patent Literature 2).

CITATION LIST

Patent Literatures

[Patent Literature 1] Japanese Published Unexamined Patent Application Publication No. 2005-351834
[Patent Literature 2] Japanese Published Unexamined Patent Application Publication No. 2006-38581

SUMMARY OF THE INVENTION

Technical Problem

However, surveying instruments are expensive apparatuses, so that one instrument is shared by a plurality of users in many cases. In this case, functions and data that a user wants to use are different among users, so that setting changes and data acquisition takes time. In addition, for proper surveys, instrument setting and functional restriction management for each personal user have been required.

An object of the present invention is to provide a surveying instrument and a surveying instrument management system to manage instrument setting and usage data for each personal user.

Solution to Problem

In order to solve the above-described problem, a surveying instrument according to an aspect of the present invention is a surveying instrument configured to measure a distance and an angle to a target, and including: a personal authentication sensor; a control unit including a personal information registration unit, a personal authentication execution unit, and a personal setting application unit; and a storage unit including a personal identification information database, and a personal setting information database, wherein the personal information registration unit acquires personal authentication information from the personal authentication sensor and stores the personal authentication information in the personal identification information database in association with user information in advance, the personal authentication execution unit identifies a user based on whether authentication data acquired by the personal authentication sensor matches personal authentication information stored in the personal identification information database before the start of the surveying instrument, and the personal setting application unit refers to the personal setting information database, and when finding instrument setting saved by an authenticated user, applies the instrument setting and starts the surveying instrument.

In the surveying instrument according to the aspect described above, it is also preferable that the storage unit further includes a personal application restriction database, and the personal setting application unit refers to the personal application restriction database, and when finding a restriction on a data area and instrument setting usable by an authenticated user, starts the surveying instrument with the restriction on the data area and the instrument setting.

In order to solve the problem described above, a surveying instrument management system according to an aspect of the present invention includes: a surveying instrument including a distance-measuring unit configured to measure a distance to a target, an angle-measuring unit configured to measure an angle to the target, a personal authentication sensor, a control unit including a personal authentication execution unit and a personal setting application unit, and a communication unit; a remote terminal including a terminal communication unit, a terminal personal authentication sensor, and a terminal control unit including a personal information registration unit; and a management server including a server communication unit configured to communicate with the communication unit and the terminal communication unit, and a server storage unit including a personal identification information database and a personal setting information database, wherein the personal information registration unit of the remote terminal acquires personal authentication information from the terminal personal authentication sensor of the remote terminal and stores the personal authentication information in the personal identification information database of the management server in association with user information in advance, the personal authentication execution unit of the surveying instrument identifies a user based on whether authentication data acquired by the personal authentication sensor matches personal authentication information stored in the personal identification information database of the management server before the start of the surveying instrument, and the personal setting application unit of the surveying instrument refers to the personal setting information database of the management server, and when finding instrument setting saved by an authenticated user, applies the instrument setting and starts the surveying instrument.

In the surveying instrument management system according to the aspect described above, it is also preferable that the server storage unit further includes a personal application restriction database, and the personal setting application unit of the surveying instrument refers to the personal application restriction database of the management server, and when finding a restriction on a data area and instrument setting usable by an authenticated user, starts the surveying instrument with the restriction on the data area and the instrument setting.

In the surveying instrument management system according to the aspect described above, it is also preferable that the control unit of the surveying instrument further comprises a personal information registration unit, the personal information registration unit of the surveying instrument acquires personal authentication information from the personal authentication sensor of the surveying instrument, and stores the personal authentication information in the personal identification information database of the management server in association with user information via the communication unit.

Effect of Invention

According to the surveying instrument and the surveying instrument management system according to the present invention, a surveying instrument can be managed for each personal user.

DESCRIPTION OF EMBODIMENTS

Next, preferred embodiments of the present invention are described with reference to the drawings.

First Embodiment

Figure 1:
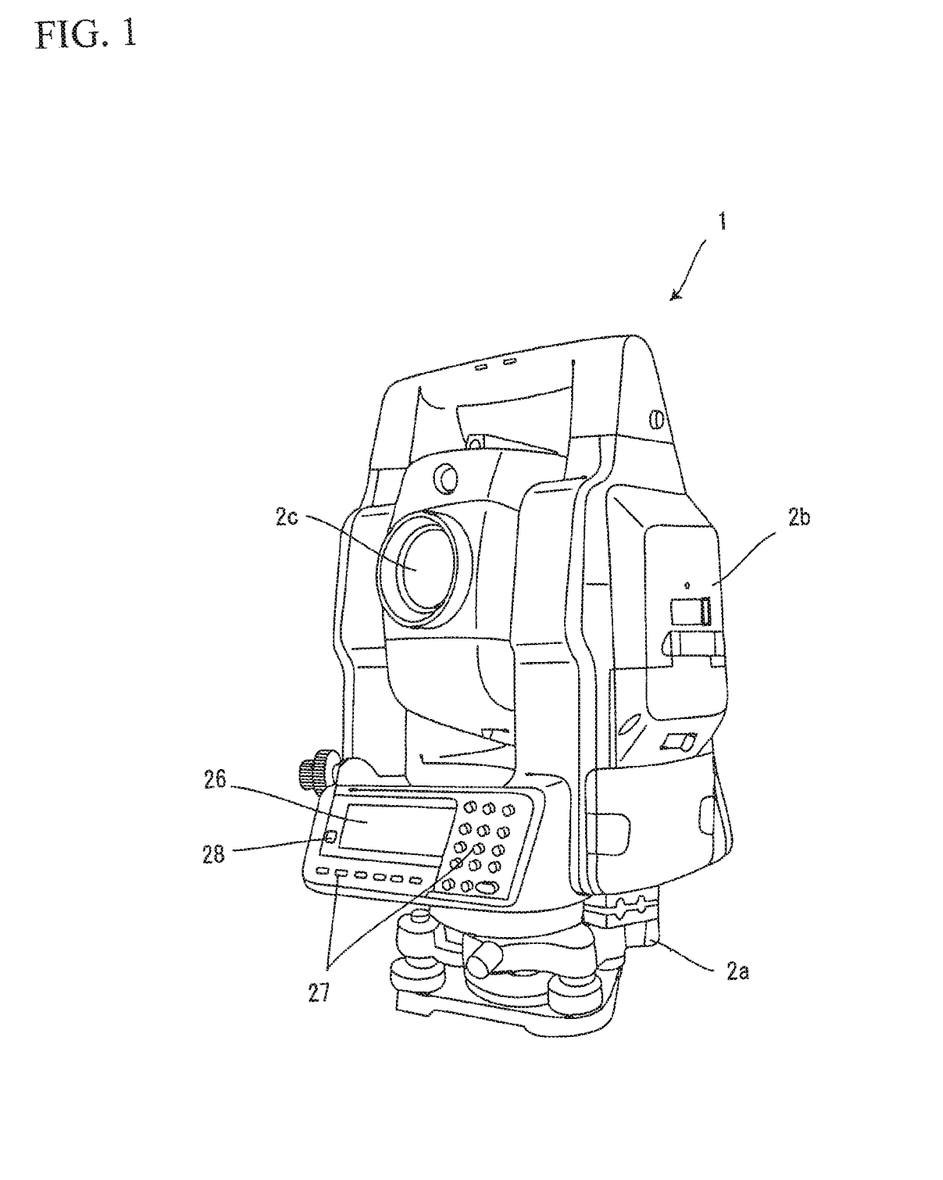
FIG. 1 is a right perspective view of a surveying instrument according to a first embodiment of the present invention.

FIG. 1 is a right perspective view of a surveying instrument 1 according to a first embodiment of the present invention. The surveying instrument 1 is a total station (electronic distance and angle-measuring instrument). The surveying instrument 1 includes a base portion 2a provided on a leveling unit (not illustrated), a bracket portion 2b that rotates horizontally on the base portion 2a, and a telescope 2c that rotates vertically at the center of the bracket portion 2b. On a front surface of the bracket portion 2b, an operation unit 27 for instrument operations and a display unit 26 are provided. In the vicinity of the display unit 26, a personal authentication sensor 28 for personal user management is disposed.

Figure 2:
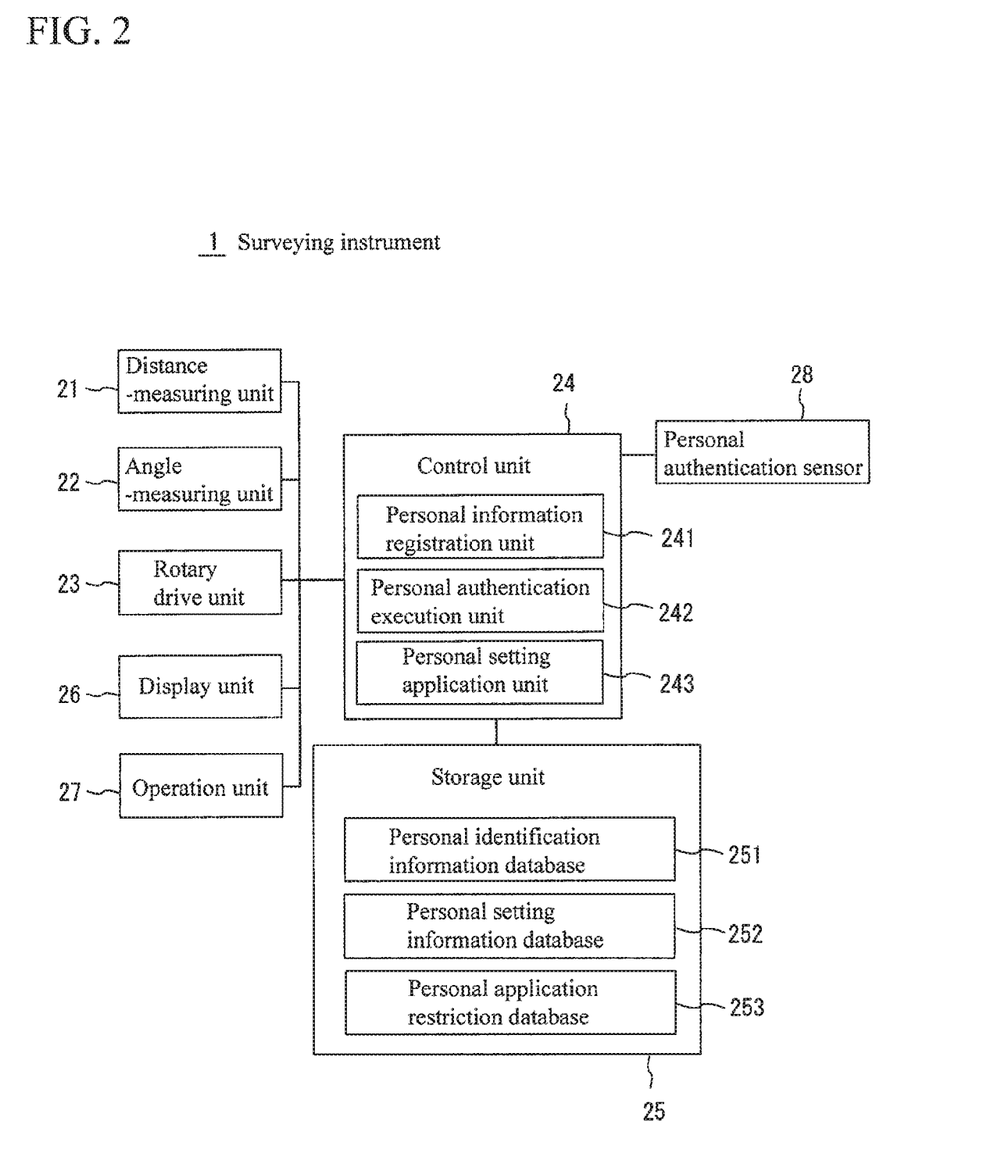
FIG. 2 is a configuration block diagram of the same embodiment.

FIG. 2 is a configuration block diagram of the surveying instrument 1. As illustrated in FIG. 2, the surveying instrument 1 includes at least a distance-measuring unit 21, an angle-measuring unit 22, a rotary drive unit 23, a control unit 24, a storage unit 25, the display unit 26, the operation unit 27, and the personal authentication sensor 28.

The distance-measuring unit 21 includes a light emitting element, a distance-measuring optical system, and a light receiving element disposed inside the telescope 2c (not illustrated). The distance-measuring unit 21 measures a distance to a target by emitting and irradiating distance-measuring light onto the target from the light emitting element via the distance-measuring optical system and receiving light reflected from the target by the light receiving element. The angle-measuring unit 22 measures a horizontal angle and a vertical angle to the target by measuring a vertical rotation angle of the telescope 2c and a horizontal rotation angle of the bracket portion 2b by rotary encoders (not illustrated) disposed at their rotary shafts. The rotary drive unit 23 is composed of motors that are controlled by the control unit 24 and drive the respective rotary shafts of the telescope 2c and the bracket 2b.

The display unit 26 has a liquid crystal screen, and enables inputs by a touch panel method. On the liquid crystal screen, a screen related to applications of various functions is displayed, and an operator can execute an application by being guided by the screen. The operation unit 27 includes a numeric keypad for numeric value and character inputs, and function keys to which some of the plurality of functions of the surveying instrument 1 are assigned. A configuration in which the operation unit 27 is displayed on the display unit 26 is also possible.

The personal authentication sensor 28 is a non-contact ID reader (radio frequency identifier) or a biometric sensor (a fingerprint sensor, an iris sensor, a vein sensor, etc.). FIG. 1 illustrates an example of a disposed position of the personal authentication sensor 28, and the personal authentication sensor 28 may be disposed at other positions on the bracket 2b, or may be disposed between a display panel and a backlight unit of the display unit 26. A plurality of kinds of personal authentication sensors 28 plural in number may be provided.

The control unit 24 is a control unit including at least a CPU and a memory (RAM, ROM, etc.) mounted on an integrated circuit. The distance-measuring unit 21, the angle-measuring unit 22, the rotary drive unit 23, the display unit 26, the operation unit 27, and the personal authentication sensor 28 are connected to the control unit 24. The control unit 24 executes applications of various functions and controls the distance-measuring unit 21, the angle-measuring unit 22, and the rotary drive unit 23. On the display unit 26, a screen related to an operation is displayed according to an application. Setting for execution of an application can be input from the operation unit 27.

Further, the control unit 24 includes a personal information registration unit 241 (hereinafter, referred to as a registration unit 241), a personal authentication execution unit 242 (hereinafter, referred to as an authentication unit 242), and a personal setting application unit 243 (hereinafter, referred to as an application unit 243) for personal user management.

The registration unit 241 functions for pre-registration of user information. The registration unit 241 associates user information and personal authentication information (an ID number or biological information such as a fingerprint, an iris, or a vein) with each other and stores these in an identification database 251 described later. The authentication unit 242 functions before the start of the surveying instrument 1. The authentication unit 242 identifies a user based on whether authentication data acquired by the personal authentication sensor 28 matches personal authentication information in the identification database 251. When the user is authenticated, the application unit 243 functions and starts the surveying instrument 1. At this time, by referring to a setting database 252 described later, when instrument setting that the authenticated user saved last is found, the setting is applied to the surveying instrument 1. In addition, by referring to a restriction database 253 described later, when data area, instrument setting, and functions specified to be usable by the authenticated user are found, the user is allowed to use the instrument only with those area and setting. Details are described later along with flowcharts.

The storage unit 25 is a storage medium, for example, a memory card, HDD (Hard Disk Drive), etc. Rewriting on the storage unit 25 from an external device is possible. In the storage unit 25, programs for execution of applications of various functions are stored. In the storage unit 25, a distance measurement value measured by the distance-measuring unit 21, an angle measurement value measured by the angle-measuring unit 22, and various information acquired by the control unit 24, are recorded together with a date and time of occurrence.

Further, the storage unit 25 includes a personal identification information database 251 (hereinafter, referred to as an identification database 251), a personal setting information database 252 (hereinafter, referred to as a setting database 252), and a personal application restriction database 253 (hereinafter, referred to as a restriction database 253) for personal user management.

In the identification database 251, user information and personal authentication information (an ID number or biological information such as a fingerprint, an iris, or a vein) registered from the registration unit 241 are stored in association with each other. In the setting database 252, instrument setting saved last is stored for each user in association with user information in the identification database 251. In the restriction database 253, usable data area (or unusable data area) and usable instrument setting and functions (or unusable instrument setting and functions) are stored for each user in association with user information in the identification database 251. Details are described along with flowcharts described later.

Figure 3:
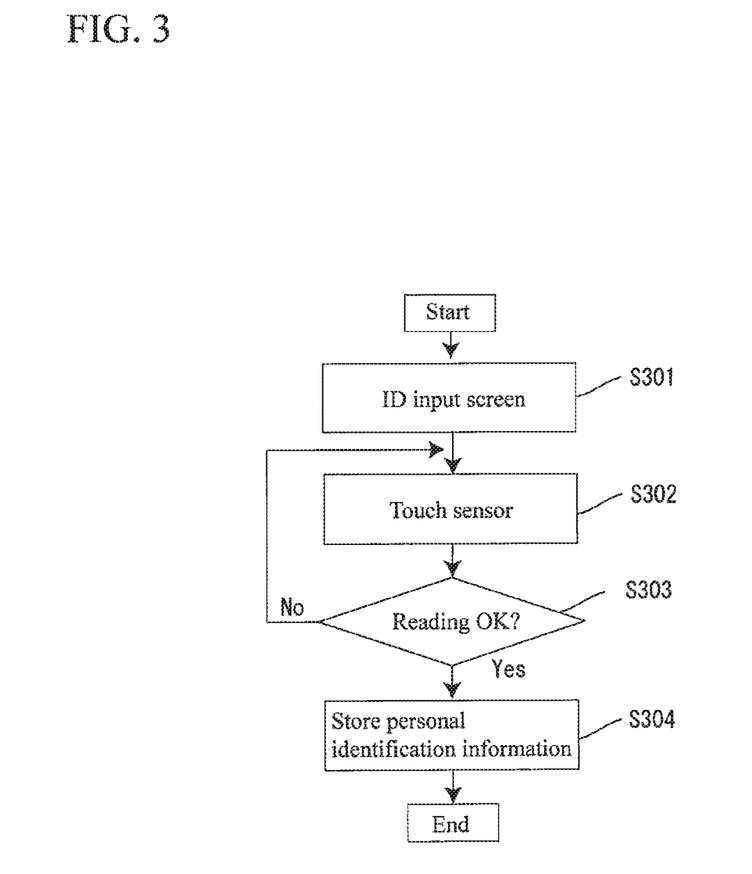
FIG. 3 is a pre-registration flowchart for personal user management of the same embodiment.

FIG. 3 is a pre-registration flowchart for personal user management.

When a pre-registration program is selected in the surveying instrument 1, the process shifts to Step S301, and the registration unit 241 displays a screen for user registration on the display unit 26. The registration unit 241 requests inputs of user information, for example, a personal name, an e-mail address, and a log-in password, etc., from a user. When the user finishes inputs in Step S301, the process shifts to Step S302, and the registration unit 241 displays, on the display unit 26, a screen to prompt the user to touch the personal authentication sensor 28.

Next, the process shifts to Step S303, and the registration unit 241 checks if the personal authentication sensor 28 could read authentication data. When reading fails, the process returns to Step S302. When the authentication data is successfully read, the process shifts to Step S304. When the process shifts to Step S304, the registration unit 241 stores the personal authentication information (an ID number or biological information such as a fingerprint, an iris, or a vein) acquired in Step S303 in the identification database 251 in association with the user information input in Step S301, and ends the pre-registration.

Figure 4:
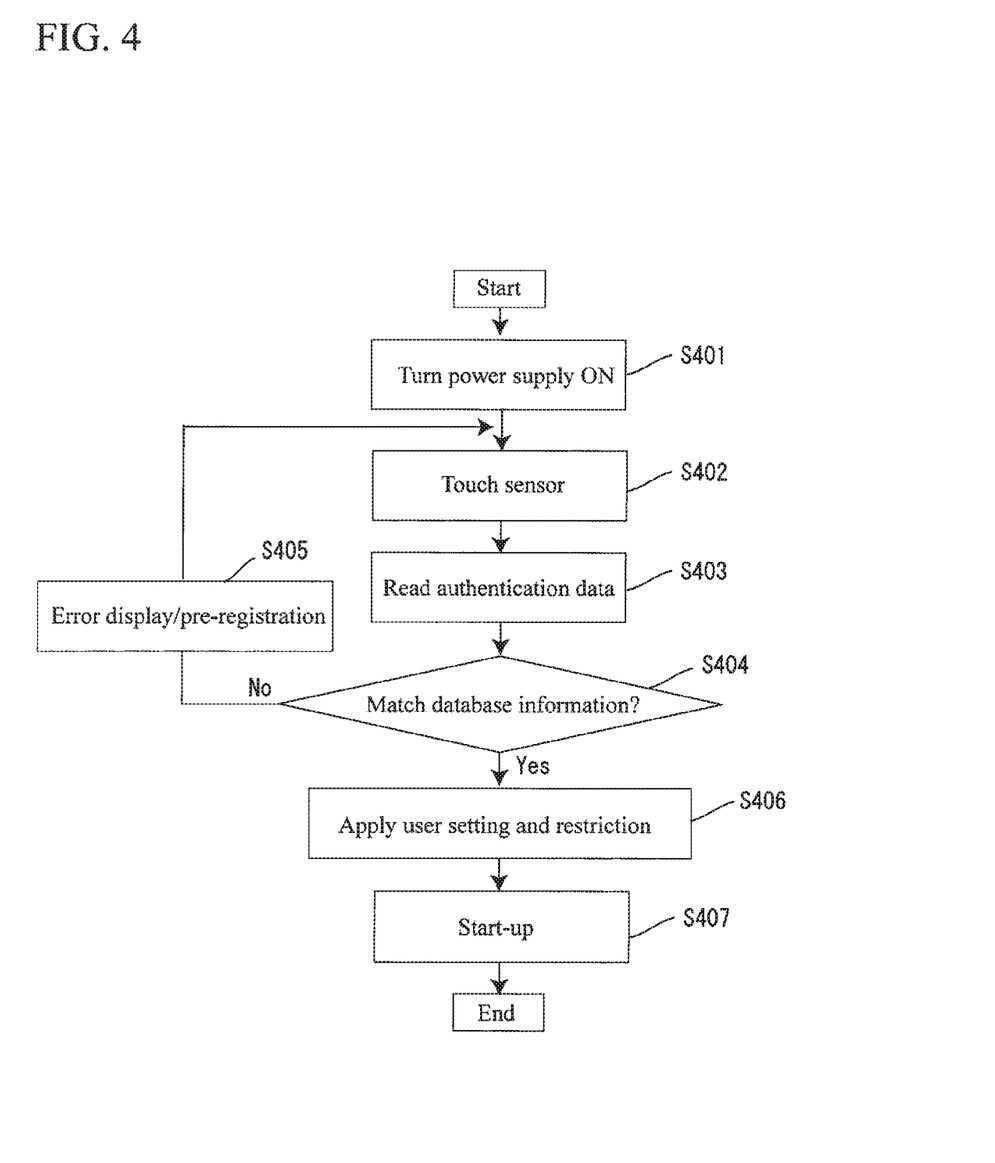
FIG. 4 is a personal user management flowchart of the same embodiment.

FIG. 4 is a personal user management flowchart to be executed by the surveying instrument 1.

First, in Step S401, when a user turns on a power supply of the surveying instrument 1, the authentication unit 242 functions and personal authentication starts. Next, the process shifts to Step S402, and the authentication unit 242 displays, on the display unit 26, a screen to prompt the user to touch the personal authentication sensor 28. In this step, when the sensor 28 is a non-contact ID reader, the user is requested to pass an ID card over the reader, when the sensor is a fingerprint sensor, the user is requested to hold his/her finger over the sensor, when the sensor is an iris sensor, the user is requested to hold his/her eye over the sensor, and when the sensor is a vein sensor, the user is requested to hold his/her palm over the sensor. When the user takes the action for the sensor 28, the process shifts to Step S403. Another flow is also possible in which when the user takes the action for the sensor 28, the power supply is automatically turned on, and personal authentication by the authentication unit 242 starts.

When the process shifts to Step S403, the authentication unit 242 reads authentication data (an ID number or biological information such as a fingerprint, an iris, or a vein) from the personal authentication sensor 28. Next, the process shifts to Step S404, and the authentication unit 242 determines whether the authentication data acquired in Step S403 matches personal authentication information accumulated in the identification database 251. When they match (YES), subsequently, the application unit 243 functions, and the process shifts to Step S406. When they do not match (NO), the process shifts to Step S405, and the authentication unit 242 displays "ERROR" on the display unit 26, and the process returns to Step S402 again. When no information is registered, a request for pre-registration is displayed on the display unit 26.

When the process shifts to Step S406, the application unit 243 restores instrument setting that the authenticated user saved by referring to the setting database 252. At the same time, the application unit 243 refers to the restriction database 253, and reads data area and instrument setting usable by the authenticated user, and when finding a restriction, applies the restriction thereto. When the application unit 243 finishes reading of the user's personal setting and functional restriction, the process shifts to Step S407, and the application unit 243 starts the surveying instrument 1.

As described above, according to the surveying instrument 1, by performing personal authentication before starting the surveying instrument 1, instrument setting is automatically changed for each personal user. That is, due to personal authentication, the surveying instrument starts with setting that each user saved, so that even when the surveying instrument 1 is shared by a plurality of users, a user can quickly start a survey without performing an operation of changing setting. Setting for each user is maintained, so that the labor of preparing can be saved.

Due to personal authentication, the surveying instrument 1 starts in a state where setting, functions, and data area usable by each user are restricted, so that even when the surveying instrument 1 is shared by a plurality of users, measurement confusion and data mix-up, etc., can be prevented.

From the standpoint of an administrator, a storage destination of personal operation data can be selected and operations can be restricted according to personal skills, so that management to enable proper surveys can be performed.

Personal authentication can also be performed by inputting an ID number and a password by a user from the operation unit 27 on a survey site, however, the operation unit 27 is configured to be suitable for a survey, so that the operation unit is insufficient as ID input keys, and inputting of an ID from keys on a survey site is troublesome. In addition, personal authentication by such a method involves a risk that an ID number or a password is forgotten or leaked. On the other hand, with the surveying instrument 1, personal authentication is performed by using physical information as a key, so that such troublesomeness and security risk can be reduced.

Second Embodiment

Figure 5:
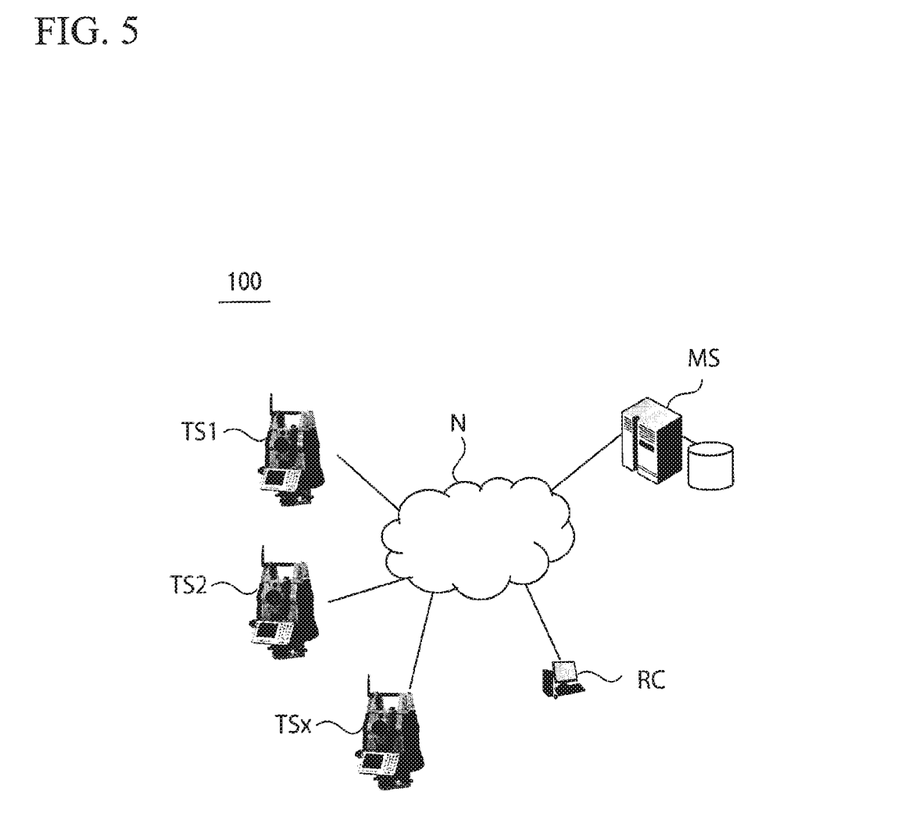
FIG. 5 is a view illustrating an entire configuration of a surveying instrument management system according to a second embodiment of the present invention.

FIG. 5 is a configuration block diagram of a surveying instrument management system 100 (hereinafter, referred to as a management system 100) according to a second embodiment of the present invention. Components being the same as in the first embodiment are provided with the same reference signs, and description thereof is omitted. In FIG. 5, the reference signs TS1, TS2, and TSx (hereinafter, description is given by using a reference sign TS1 as a representative) denote surveying instruments, and are some of a plurality of managing targets. The reference sign MS denotes a management server, and the reference sign RC denotes a remote terminal. The surveying instruments TS1, TS2, and TSx, the management server MS, and the remote terminal RC are capable of communicating with each other via a communication network N such as the Internet or a satellite communication network.

Figure 6:
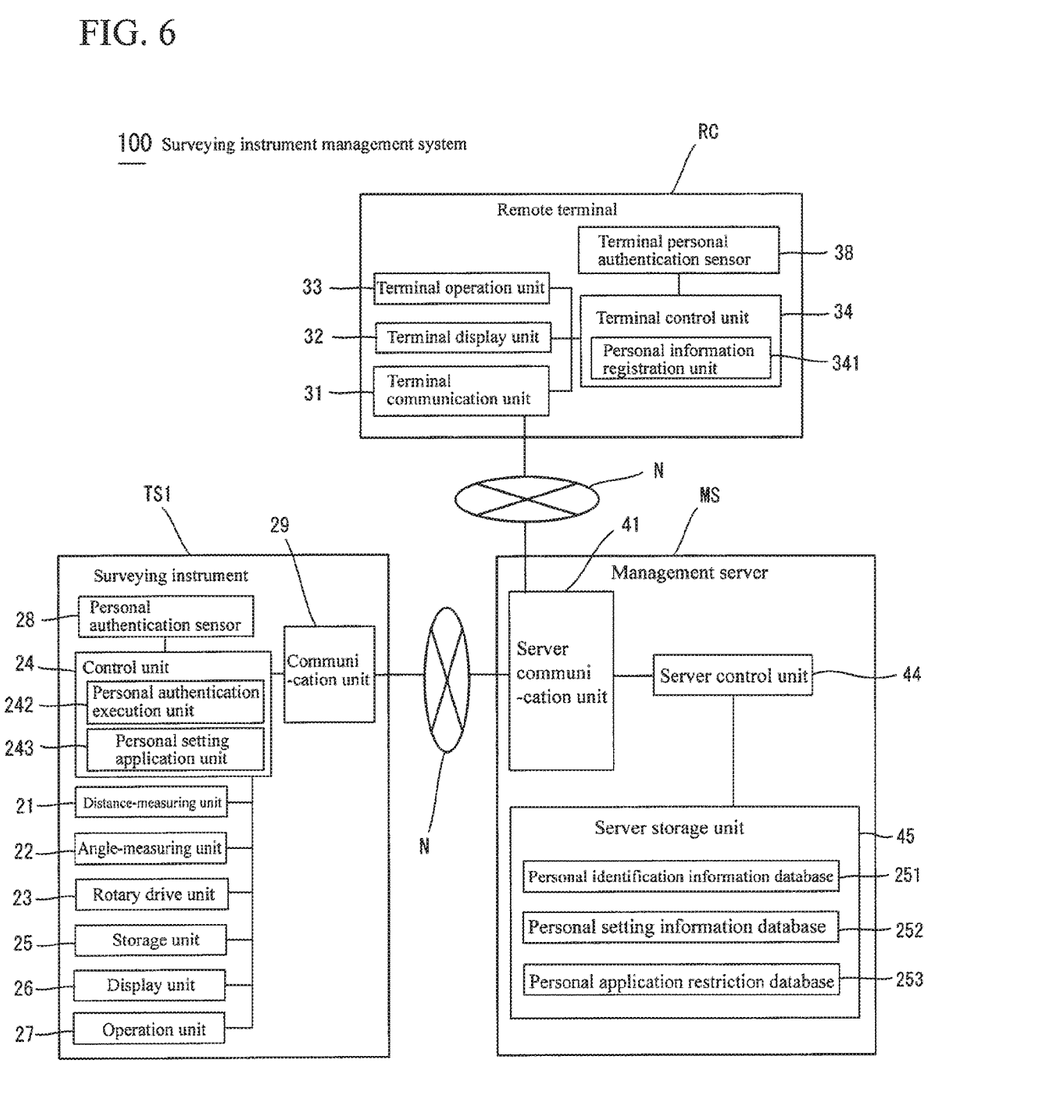
FIG. 6 is a configuration block diagram of the same embodiment.

FIG. 6 is a configuration block diagram of the management system 100.

The surveying instrument TS1 includes the distance-measuring unit 21, the angle-measuring unit 22, the rotary drive unit 23, the control unit 24, the storage device 25, the display unit 26, the operation unit 27, and the personal authentication sensor 28, and further includes a communication unit 29. The control unit 24 transmits and receives information to and from the management server MS via the communication network N by using the communication unit 29. For personal user management, the control unit 24 includes the personal authentication execution unit 242 and the personal setting application unit 243. The identification database 251, the setting database 252, and the restriction database 253 that are included in the storage unit 25 in the first embodiment are included in the management server MS descried later.

The remote terminal RC is a terminal such as a personal computer, a smartphone, or a tablet, etc., of an owner (administrator) of the surveying instrument TS1. The remote terminal RC includes, as illustrated in FIG. 6, at least a terminal communication unit 31, a terminal display unit 32, a terminal operation unit 33, a terminal control unit 34, and a terminal personal authentication sensor 38. The terminal communication unit 31 can transmit and receive information to and from the server communication unit 41 of the management server MS described later via the communication network N. The terminal personal authentication sensor 38 is equivalent to the personal authentication sensor 28 described above. The terminal control unit 34 includes a personal information registration unit 341 that functions equivalently to the registration unit 241 of the first embodiment.

The management server MS includes, as illustrated in FIG. 6, at least a server communication unit 41, a server control unit 44, and a server storage unit 45. The server communication unit 31 can transmit and receive information to and from the terminal communication unit 31 of the remote terminal RC and the communication unit 29 of the surveying instrument TS1 via the communication network N. The server control unit 44 controls the server communication unit 41 and controls reading out from the server storage unit 45. The server storage unit 45 includes the identification database 251, the setting database 252, and the restriction database 253 that are stored in the surveying instrument 1 in the first embodiment.

According to the management system 100 of the present embodiment, pre-registration for personal user management is performed in the remote terminal RC. Pre-registration in this embodiment is described with reference to FIG. 3.

When a pre-registration program is selected in the remote terminal RC, first, in Step S301, the registration unit 341 of the remote terminal RC displays a screen for user registration on the terminal display unit 32. The registration unit 341 requests inputs of user information, for example, a personal name, an e-mail address, a log-in password, etc., from a user. When the user finishes inputs in S301, the process shifts to Step S302, and the registration unit 341 displays, on the terminal display unit 32, a screen to prompt the user to touch the terminal personal authentication sensor 38 equipped in the remote terminal RC.

Next, the process shifts to Step S303, and the registration unit 341 checks if the terminal personal authentication sensor 38 could read authentication data. When reading fails, the process returns to Step S302. When the data is successfully read, the process shifts to Step S304. When the process shifts to Step S304, the registration unit 341 communicates with the server communication unit 41 via the terminal communication unit 31, and stores personal authentication information (an ID number or biological information such as a fingerprint, an iris, or a vein) acquired in Step S303 in the identification database 251 of the management server MS in association with the user information input in Step S301, and ends the pre-registration.

Figure 7:
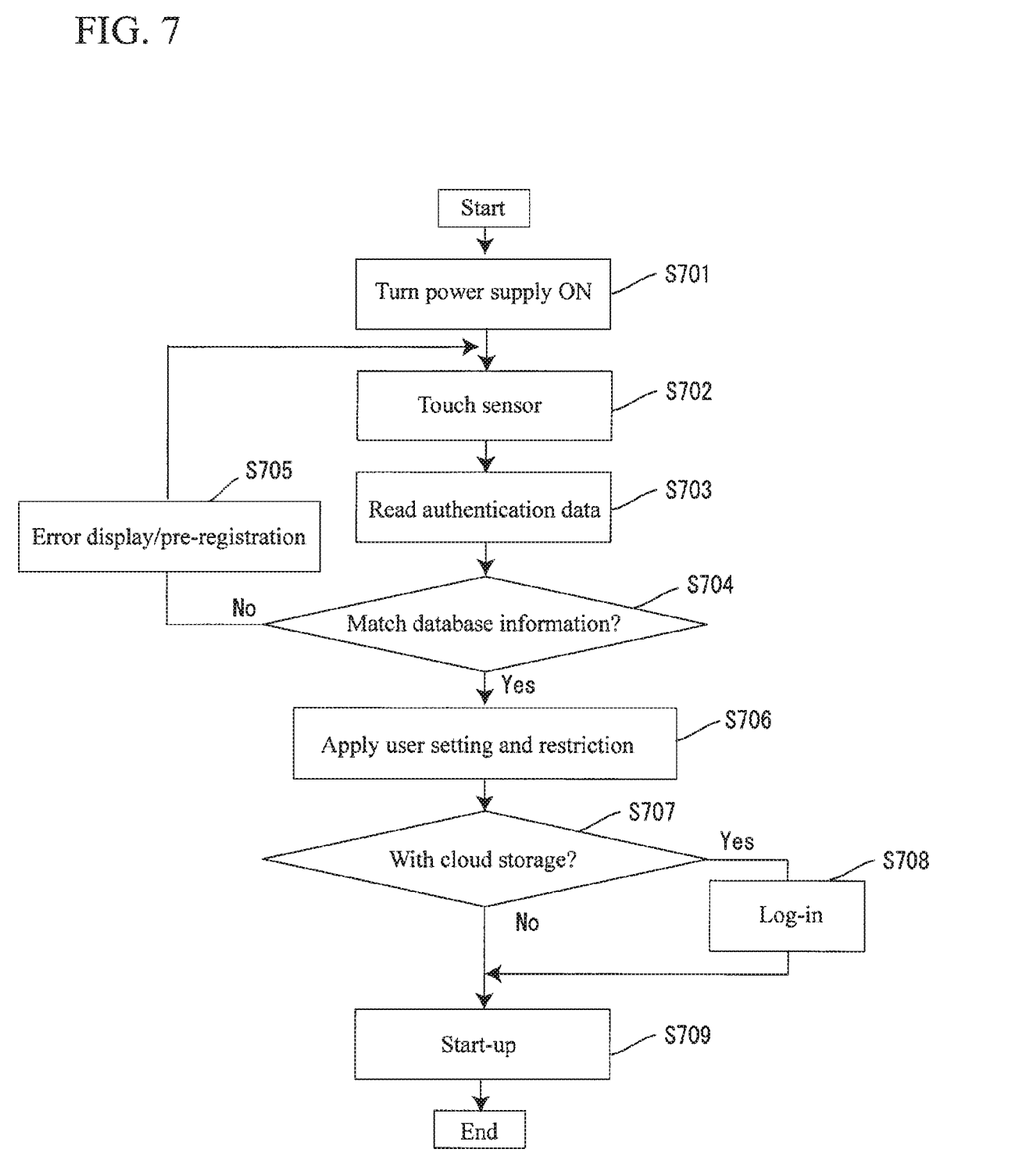
FIG. 7 is a personal user management flowchart of the same embodiment.

FIG. 7 is a personal user management flowchart to be executed by the management system 100.

First, in Step S701, when a user turns on the power supply of the surveying instrument TS1, the authentication unit 242 functions and personal authentication starts. Next, when the process shifts to Step S702, the authentication unit 242 displays, on the display unit 26, a screen to prompt the user to touch the personal authentication sensor 28. When the user takes an action for the sensor 28, the process shifts to Step S703. Another flow is also possible in which when the user takes an action for the sensor 28, the power supply is automatically turned on and personal authentication by the authentication unit 242 starts.

When the process shifts to Step S703, the authentication unit 242 reads authentication data (an ID number or biological information such as a fingerprint, an iris, or a vein) from the personal authentication sensor 28. Next, the process shifts to Step S704, and the authentication unit 242 accesses the identification database 251 stored in the management server MS via the communication unit 29, and determines whether the authentication data acquired in Step S703 matches personal authentication information accumulated in the identification database 251.

When they match (YES), subsequently, the application unit 243 functions, and the process shifts to Step S706. When they do not match (NO), the process shifts to Step S705, and the authentication unit 242 displays "ERROR" on the display unit 26, and the process returns to Step S702 again. When no information is registered, a request for pre-registration is displayed on the display unit 26. When the process shifts to Step S706, the application unit 243 accesses the setting database 252 stored in the management server MS via the communication unit 29, and receives and restores instrument setting that the authenticated user saved. At the same time, the application unit 243 accesses the restriction database 253 stored in the management server MS, and receives data area and instrument setting usable by the user, and when there is a restriction, applies the restriction thereto.

When the application unit 243 finishes reading of user's personal setting and functional restriction, the process shifts to Step S707 next, and the application unit 243 asks the user whether there is cloud storage setting. When there is no cloud storage setting, the process shifts to Step S709, and the surveying instrument TS1 is started. When there is cloud storage setting, the process shifts to Step S708, and the user is requested to log into a cloud storage, and then, the process shifts to Step S709, and the surveying instrument TS1 is started.

As described above, according to the surveying instrument management system 100, in addition to the effect of the first embodiment, personal authentication information and setting and restriction information for each personal user are stored in the management server MS, so that a user can quickly start a survey from each of the surveying instrument TS1, the surveying instrument TS2, and the surveying instrument TSx without performing an operation of changing setting. That is, any surveying instrument is started with setting for each user, so that the problem of the instrument mix-up can be solved. In addition, pre-registration for personal authentication is performed not from the operation unit 27 of the surveying instrument TS1 but from the remote terminal RC, so that the troublesomeness is further reduced. In addition, collaboration with a cloud storage is possible, so that user information and data stored in the cloud is available any time.

It is also possible to configure the management system 100 so that pre-registration can be performed from the surveying instrument TS1 as well. That is, it is also possible that the surveying instrument TS1 is also provided with a registration unit 241, and transmits personal authentication information acquired by the registration unit 24 to the identification database 251 of the management server MS via the communication unit 29. When the personal authentication sensor 28 (38) is a non-contact ID reader, an ID number may be assigned not to each person but to each group.

The preferred embodiments of the present invention are described above, and the embodiments can be modified based on knowledge of a person skilled in the art, and such a modified embodiment is also included in the scope of the present invention.

REFERENCE SIGNS LIST

1 Surveying instrument
21 Distance-measuring unit
22 Angle-measuring unit
23 Rotary drive unit
24 Control unit
241 Personal information registration unit
242 Personal authentication execution unit
243 Personal setting application unit
25 Storage unit
251 Personal identification information database
252 Personal setting information database
253 Personal application restriction database
28 Personal authentication sensor
100 Surveying instrument management system
TS Surveying instrument
29 Communication unit
RC Remote terminal
31 Terminal communication unit
34 Terminal control unit
341 Personal information registration unit
38 Terminal personal authentication sensor
MS Management server
41 Server communication unit
45 Server storage unit

The invention claimed is:

1. A surveying instrument configured to measure a distance and an angle to a target, comprising:
   a personal authentication sensor;
   a control unit including a personal information registration unit, a personal authentication execution unit, and a personal setting application unit; and
   a storage unit including a personal identification information database, and a personal setting information database, wherein
   the personal information registration unit is configured to acquire personal authentication information from the personal authentication sensor and store the personal authentication information in the personal identification information database in association with user information in advance,
   the personal authentication execution unit is configured to identify a user based on whether authentication data acquired by the personal authentication sensor matches personal authentication information stored in the personal identification information database before the start of the surveying instrument,
   the personal setting application unit is configured to refer to the personal setting information database, and when finding instrument setting saved by an authenticated user, apply the instrument setting and start the surveying instrument, and
   the personal setting application unit is further configured to ask the user whether there is a cloud storage setting before starting the surveying instrument.

2. The surveying instrument according to claim 1, wherein
   the storage unit further includes a personal application restriction database, wherein
   the personal setting application unit is configured to refer to the personal application restriction database, and when finding a restriction on a data area and instrument setting usable by an authenticated user, start the surveying instrument with the restriction on the data area and the instrument setting.

3. A surveying instrument management system comprising:
   a surveying instrument including a distance-measuring unit configured to measure a distance to a target, an angle-measuring unit configured to measure an angle to the target, a personal authentication sensor, a control unit including a personal authentication execution unit and a personal setting application unit, and a communication unit;
   a remote terminal including a terminal communication unit, a terminal personal authentication sensor, and a terminal control unit including a personal information registration unit; and
   a management server including a server communication unit configured to communicate with the communication unit and the terminal communication unit, and a server storage unit including a personal identification information database and a personal setting information database, wherein
   the personal information registration unit of the remote terminal is configured to acquire personal authentication information from the terminal personal authentication sensor of the remote terminal and store the personal authentication information in the personal identification information database of the management server in association with user information in advance, the personal authentication execution unit of the surveying instrument is configured to identify a user based on whether authentication data acquired by the personal authentication sensor matches personal authentication information stored in the personal identification information database of the management server before the start of the surveying instrument, and the personal setting application unit of the surveying instrument is configured to refer to the personal setting information database of the management server, and when finding instrument setting saved by an authenticated user, apply the instrument setting and start the surveying instrument, and the personal setting application unit is further configured to ask the user whether there is a cloud storage setting before starting the surveying instrument.

4. The surveying instrument management system according to claim 3, wherein the server storage unit further includes a personal application restriction database, and the personal setting application unit of the survey instrument is configured to refer to the personal application restriction database of the management server, and when finding a restriction on a data area and instrument setting usable by an authenticated user, start the surveying instrument with the restriction on the data area and the instrument setting.

5. The surveying instrument management system according to claim 4, wherein the control unit of the surveying instrument further comprises a personal information registration unit, the personal information registration unit of the surveying instrument is configured to acquire personal authentication information from the personal authentication sensor of the surveying instrument, and store the personal authentication information in the personal identification information database of the management server in association with user information via the communication unit.

6. The surveying instrument management system according to claim 3, wherein the control unit of the surveying instrument further comprises a personal information registration unit, the personal information registration unit of the surveying instrument is configured to acquire personal authentication information from the personal authentication sensor of the surveying instrument, and store the personal authentication information in the personal identification information database of the management server in association with user information via the communication unit.

\* \* \* \* \*